United States Patent [19]
Askinazy

[11] 3,820,614
[45] June 28, 1974

[54] BABY CARRIAGE RECIPROCATOR

[76] Inventor: Leo Askinazy, 47 Whitman Dr., Brooklyn, N.Y. 11207

[22] Filed: Feb. 15, 1973

[21] Appl. No.: 332,572

[52] U.S. Cl. ............................................. 180/1 E
[51] Int. Cl. ............................................. B62b 9/22
[58] Field of Search .................................. 180/1 E

[56] References Cited
UNITED STATES PATENTS

| | | | |
|---|---|---|---|
| 630,422 | 8/1899 | Stock | 180/1 E |
| 1,480,451 | 1/1924 | Koch | 180/1 E |
| 1,553,889 | 9/1925 | Boettcher | 180/1 E |
| 2,482,318 | 9/1949 | Carruth | 180/1 E |

FOREIGN PATENTS OR APPLICATIONS

| | | | |
|---|---|---|---|
| 46,509 | 2/1909 | Switzerland | 180/1 E |
| 749,967 | 1933 | France | 180/1 E |
| 1,103,398 | 11/1955 | France | 180/1 E |
| 1,377,586 | 9/1964 | France | 180/1 E |

Primary Examiner—David Schonberg
Assistant Examiner—Terrance L. Siemens
Attorney, Agent, or Firm—Clarence A. O'Brien; Harvey B. Jacobson

[57] ABSTRACT

A device for producing reciprocal motion of a baby carriage, or other wheeled vehicle, said device comprising a motor with an eccentric, a linkage operatively connecting the eccentric to one of the carriage wheels, and means for conveniently mounting the motor to the carriage framework and permitting adjustment of the motor's spacing relative to the wheel to select the desired angular displacement of the reciprocal movement imparted to the wheel.

2 Claims, 3 Drawing Figures

PATENTED JUN 28 1974　　　　　　　　　　　　　　　　　　　3,820,614

BABY CARRIAGE RECIPROCATOR

This invention is generally related to a device which may be mounted to a conventional baby carriage having a support framework which carries a plurality of wheels and is effective to transmit oscillatory motion to one of the wheels to effect reciprocal movement of the carriage.

It is not uncommon that when an infant or small child is placed in a crib, carriage, or the like, he begins to cry. Often, such crying is due in part to his realization that he has been suddenly abandoned or left alone. However, in most cases, when the carriage is rocked or otherwise moved, the movement and sound thereof tends to comfort the infant such that he is quieted or even lulled to sleep. Unfortunately, this is most time-consuming for the person attending to the infant, making it impossible for him to attend to other matters if he so desired. Thus, in such situations, it would be desirable to provide continuous motion of a baby carriage, or similar vehicle, without the need for continuous manipulation or pushing the carriage along the ground.

In the past, various devices have been proposed for producing rocking movement of cribs and other devices to rock infants to sleep. However, such devices, for the most part, have proven unacceptable due to the fact that they have been of relatively complex construction and have been expensive to manufacture and maintain.

It is an object of the present invention to provide a novel device for producing reciprocal movement of baby carriages and other wheeled vehicles to provide a gentle, rhythmatic movement to pacify the child, without the need of manually moving or rocking the carriage.

Another object of the present invention is to provide a unique baby carriage reciprocator which may be conveniently mounted to existing baby carriage structures to produce motor driven reciprocal movement thereof.

It is a further object of the present invention to provide a versatile baby carriage reciprocator which may be easily mounted to a baby carriage support framework adjacent one of the wheels to transmit oscillatory movement of the wheel through a selected angular displacement, whereby the distance of reciprocal travel may be selectively adjusted to a desired setting.

Still another object of the present invention is to provide a device for producing reciprocal motion of a baby carriage, the device including a small number of moving parts, being easy to install, and economical to manufacture and maintain.

These together with other objects and advantages which will become subsequently apparent reside in the details of construction and operation as more fully hereinafter described and claimed, reference being had to the accompanying drawings, forming a part hereof, wherein like numerals refer to like parts throughout.

Figure 1:
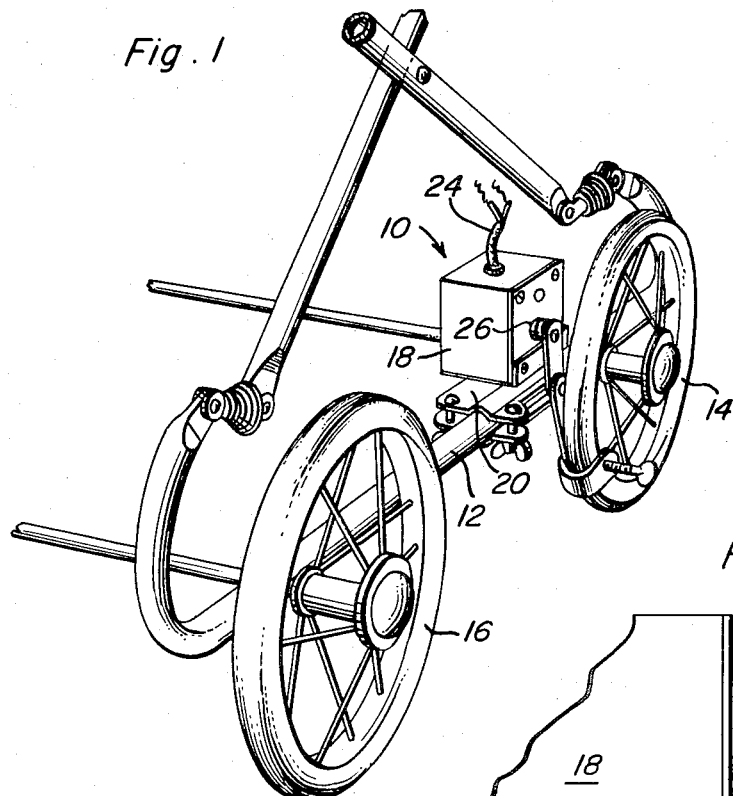
FIG. 1 is a perspective view of the device of the present invention mounted to a typical baby carriage framework.

Referring now, more particularly, to the drawings, the device of the present invention is generally indicated by the numeral 10 and is illustrated as being mounted to a typical baby carriage frame member 12 which also serves to rotatably support a pair of wheels 14 and 16. The reciprocal motion producing device of the present invention includes a motor 18 which is attached to an upper mounting bracket 20 by rivets 22, or other suitable fastening means. Preferably, motor 18 is of a conventional rotary type and may be powered by a battery carried by the vehicle or by way of an electrical cord, such as that indicated at 24, connected to a wall receptacle or other source of voltage.

Figure 2:
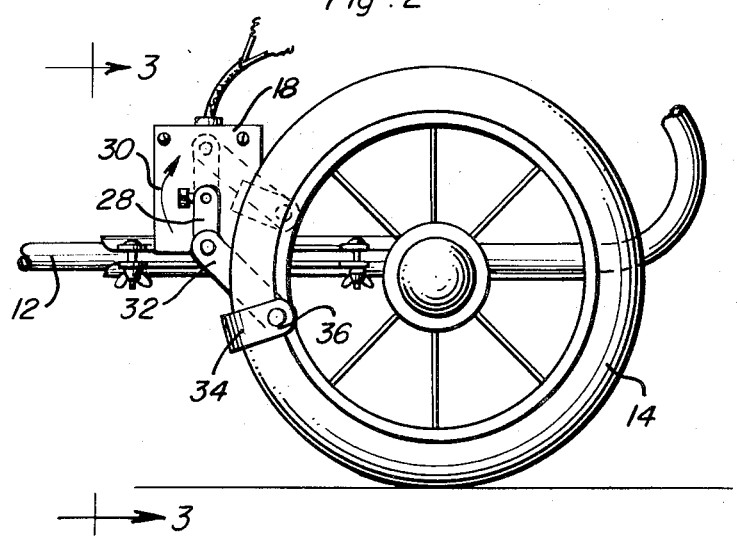
FIG. 2 is a side elevation of the device shown in FIG. 1.

Motor 18 is provided with a rotary output shaft 26 which drives an eccentric member 28 in a circular path, as indicated by arrow 30 in FIG. 2. A rigid lever member 32 is rotatably connected at one end thereof to eccentric 28 and serves to transmit movement to wheel 14, by way of a fastening member 34 attached to the periphery of wheel 14. Fastening member 34 is pivotally connected to the remote end of lever member 32, such that when motor 18 is driven, it imparts an oscillatory movement to the wheel. Preferably, fastening member 34 is of rigid, U-shaped configuration of a dimension similar to the dimension of the periphery of the carriage wheel. A thumbscrew 36, or other suitable fastening means, is carried by member 34 to permit tightening thereof to the periphery of the carriage wheel. Thus, it is possible to quickly and conveniently mechanically couple the motor to a selected carriage wheel during installation. Also, the device may be readily disconnected, allowing free movement of the wheel for normal use of the carriage.

Figure 3:
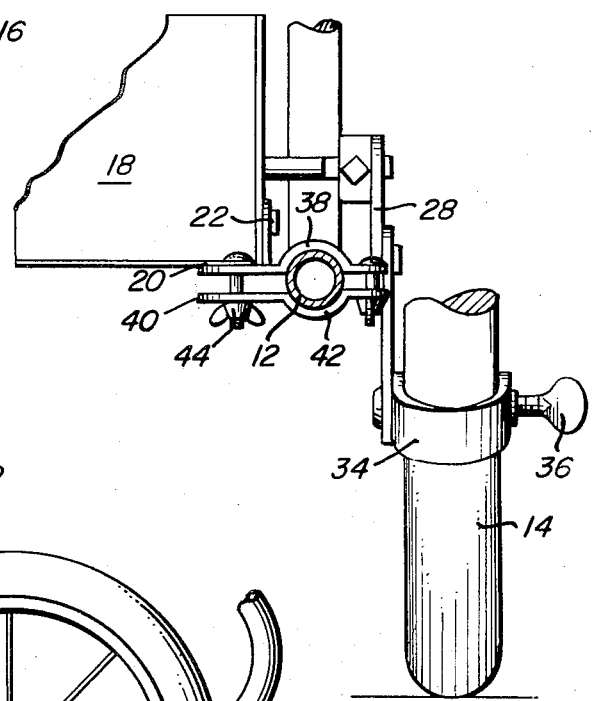
FIG. 3 is a sectional view taken along section 3—3 of FIG. 2.

Referring more particularly to FIG. 3, it will be observed that the drive motor mounting bracket 20 is fastened to frame member 12 by way of a split sleeve arrangement. Upper bracket 20 is provided with a curved or generally semi-cylindrical area 38 which is adapted to partially embrace the upper surfaces of frame member 12. A lower bracket member 40 is provided which is of configuration similar to upper bracket 20 and including a curved portion 42 which engages the lower surfaces of frame member 12. A plurality of bolts and wing nuts 44 interconnect the upper and lower bracket members and may be conveniently tightened to hold the drive motor firmly in place relative to the carriage framework. It will be appreciated that the device of the present invention may be quickly and conveniently mounted to many existing baby carriage frameworks by merely tightening a group of wing nuts, or similar fasteners. Of course, the device of the present invention may be provided with mounting brackets of various configurations in order to accommodate convenient mounting to all of the popular baby carriage constructions.

Referring again to FIG. 2 of the drawings, it will be observed that as motor 18 is driven in a circular path, wheel 14 is rotated through an angular displacement, the ends of which are defined by the solid and dash line views. The magnitude of angular displacement is dependent upon the dimensions of the eccentric and lever member, and the spacing between the motor output shaft and the periphery of wheel 14. If the spacing between the output shaft and wheel periphery is changed, there will be a corresponding change in the magnitude of angular displacement produced by the drive motor. Frame member 12 is of generally elongated configuration and extends in a generally radial direction relative to wheel 14. It is possible to adjust the spacing between the wheel and motor output shaft by merely loosening wing nuts 44 associated with the motor mounting brackets and sliding the motor to the desired location along frame member 12. This adjusts the length of reciprocal movement which will be imparted to the carriage. Since most conventional baby carriage constructions include a framework similar to that illustrated in the drawings, the device of the present invention may be easily mounted thereto and conveniently adjusted to provide the desired angular displacement through which the wheel is oscillated. One setting may provide reciprocal movement of the carriage, say a distance of 6 inches, while another setting may limit the movement to, say 1 inch. Thus, each setting rocks the infant in a different manner and the setting may be changed until the most desirable results are obtained.

This invention may also be associated with a baby crib for reciprocating the crib. When used with a crib, the motor and motor bracket are secured to the floor surface or other stationary component of the building structure and the eccentrically connected lever member is connected to the frame or other supporting component of the crib. In order to enhance the operation of the invention when used with a crib, the normally provided casters or rollers on the crib may be removed and coil springs attached to the crib in the same location which will provide a resilient movement to the crib. The lower ends of the springs may be anchored to the floor surface to assure lateral flexing of the springs during reciprocation or oscillation of the crib.

From the foregoing description, it will be appreciated that the device of the present invention is of relatively simple construction, and includes a minimum number of moving parts. Furthermore, it is readily adaptable to use with most conventional baby carriage constructions. Preferably, the motor and linkage connecting it to the carriage wheel are of heavy duty steel construction, providing reliable, trouble-free operation over a long period of time.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. As an article of manufacture, a reciprocating means for a baby supporting means consisting of an electric motor means adjustably mounted, for varying the magnitude of reciprocating motion, on a stationary portion of a baby supporting means and having a rotary output shaft, an eccentric extending from an end of said shaft, a horseshoe-shaped fastening means having a thumbscrew-type fastening means threaded into one tip of one leg of the horseshoe-shaped means and the thumb portion of the thumbscrew extending away from the motor means, linkage means having a pivotal connection means at each end, one end connected to said eccentric and the other end connected to said horseshoe-shaped means, on the tip opposite to the tip having the thumbscrew-type fastening means, said horseshoe-shaped means being connectible to a relatively movable portion of the baby supporting means.

2. As an article of manufacture, a reciprocating means for a baby carriage having a support framework and wheels thereunder, consisting of an electric motor means adjustably mounted, for varying the magnitude of reciprocating motion, on a generally horizontally arranged elongated frame portion of the supporting framework, adjacent one of the wheels, and extending in a radial direction with respect to said one wheel, mounting bracket means and wing nut means releasably attaching said motor means to said elongated frame portion, said motor means including an output shaft, an eccentric affixed to an end of said shaft, a horseshoe-shaped fastening means having a thumbscrewtype fastening means threaded through one tip of one leg of the horseshoe-shaped means and the thumb portion of the thumbscrew extending away from said motor means, the thumbscrew in the one tip of said horseshoe-shaped means being used to releasably fasten said horseshoe-shaped means to said one wheel, linkage means having a pivotal connection means at each end, one end connected to said eccentric and the other end connected to said horseshoe-shaped means on the tip opposite to the tip having the thrumbscrew-type fastening means.

* * * * *